United States Patent
Tin (10) Patent No.: US 7,414,753 B2
(45) Date of Patent: Aug. 19, 2008

(54) COLOR CHARACTERIZATION USING NONLINEAR REGRESSION

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 814 days.

(21) Appl. No.: 10/840,539

(22) Filed: May 6, 2004

(65) Prior Publication Data

US 2005/0248783 A1 Nov. 10, 2005

(51) Int. Cl.
H04N 1/40 (2006.01)

(52) U.S. Cl. .......................... 358/1.9; 358/2.1; 358/504

(58) Field of Classification Search ................. 358/1.9, 358/2.1, 500, 504, 516–520, 523; 382/162, 382/167
See application file for complete search history.

(56) References Cited

U.S. PATENT DOCUMENTS

| 6,157,396 | A * | 12/2000 | Margulis et al. ............ 345/506 |
| 6,646,763 | B1 | 11/2003 | Estrada ....................... 358/1.9 |
| 6,825,876 | B1 * | 11/2004 | Easwar et al. ............... 348/234 |
| 7,116,441 | B1 * | 10/2006 | Matsuoka ................... 358/1.9 |
| 2005/0213813 | A1 * | 9/2005 | Lin et al. .................... 382/167 |

FOREIGN PATENT DOCUMENTS

JP 2005153289 A * 6/2005

OTHER PUBLICATIONS

D. J. Littlewood et al., "Pareto-Optimal Formulations for Cost versus Colorimetric Accuracy Trade-Offs in Printer Color Management", ACM Transactions on Graphics, vol. 21, No. 2, Apr. 2002, pp. 132-175.
Hunt, R.W.G., *Measuring Colour*, 3rd Ed., 63-68, Fountain Press, 1998.
Press, W.H. et al., *Numerical Recipes in C: The Art of Scientific Computing*, 2nd Ed., Cambridge University Press, 1993.
Shepard, D., "A two-dimensional interpolation function for irregularly spaced data", Proceedings of the 23rd ACM Natl. Conf., pp. 517-524, 1968.
Kang, H.R., "Color scanner calibration", *J. Imag. Sci. Tech.*, 36, pp. 162-170, 1992.
Kang, H.R., *Color Technology for Electronic Imaging Devices*, SPIE, pp. 272-294, 1997.
Draper, N.R. et al., *Applied Regression Analysis*, 3rd Ed., Wiley-Interscience, 1998.

* cited by examiner

*Primary Examiner*—Thomas D. Lee
*Assistant Examiner*—Stephen Brinich
(74) *Attorney, Agent, or Firm*—Fitzpatrick, Cella, Harper & Scinto (57) ABSTRACT

A color characterization process utilizing nonlinear regression analysis to characterize a color input device. The color input device is used to generate a bitmap of device dependent values from a color target. The bitmap of device dependent color values is used to generate a forward model that maps device dependent color values to color values in a device independent color space using a nonlinear regression analysis that minimizes a color difference metric between the reference color values and the set of device dependent color values mapped through the forward model. The color difference metric is chosen to represent human perceived color differences in the device independent color space. The performance of the nonlinear regression analysis may be improved by initializing the nonlinear regression analysis using an initial forward model generated from a linear regression analysis.

30 Claims, 6 Drawing Sheets

COLOR CHARACTERIZATION USING NONLINEAR REGRESSION

BACKGROUND AND SUMMARY

1. Field of the Invention

The present invention generally relates to characterization of color devices and more particularly to characterization of a color input device using nonlinear regression.

2. Description of the Related Art

Electronic color devices used to input electronic documents represent colors using three colors of light, namely Red, Green, and Blue (RGB). By adding varying intensities of these three colors of light, electronic devices can simulate the appearance of a variety of colors. A color input device, such as a document scanner, uses light sensors to measure the intensity of red, green, and blue light reflected from an object. These measurements of the intensity of the individual colors of light may then be used by other color devices to represent the color of the captured object. Because red, green, and blue light may be added together to simulate colors, they are termed "additive primaries."

Within a color device, a color may be represented using three variables representing the separate intensities of the red, green, and blue light that are combined to create the color. The set of three values is termed a "color value." As three values are used to describe a color value, color values may be thought of as being points within a three-dimensional space termed a "color space."

The response of a color input device to red, green, and blue light intensities varies based on the color input device's optical design, sensor materials, and electronic systems. This means that different color input devices having different designs will generate different device dependent color values for the same source image. Therefore, in order to accurately input a color into a color input device and then display that color on a color output device, the color values generated by the input color device for a color must be mathematically transformed to generate the color values corresponding to that color on the color output device.

Management of the transformations between color input device color values and color output device color values is ordinarily performed by a Color Management System (CMS) within a data processing system such as a personal computer. A typical CMS manages color value transformations between a variety of color input and output devices. This means that the CMS must be able to transform color value data from each potential color input device for display on each potential color output device. The CMS's task is made simpler by transforming device dependent color values, which represent colors for one particular device, into a common device independent color space. Within the color space, colors may be represented by a small set of continuous variables with each color represented by a unique set of values. For example, when the color input device generates a device dependent color value in response to a specific source color, the device dependent color value is transformed into a color value in the device independent color space representing the specified color. To display the specified color on a color output device, the color value in the device independent color space is transformed into a device dependent color value that is used by the color output device to generate the specified color.

Use of a device independent color space simplifies the operations of a CMS because the CMS does not need to keep track of a transformation for each possible pairing of color input device and color output device. Instead, the CMS maintains a device profile for each color device. A color input device's profile describes the transformation used to transform the color input devices's color values into a color represented in the device independent color space.

Standardized device independent color spaces are established by standards organizations such as the Commission Internationale de l'Éclairage (CIE). For example, CIE has specified the perceptually non-uniform color space CIEXYZ in 1931, and the perceptually uniform color spaces CIELUV, CIELAB in 1976. They are by far still the most commonly used device independent color spaces.

The main difference between CIEXYZ and CIELUV or CIELAB is that CIELUV and CIELAB were designed to be perceptually uniform. A perceptually uniform space has the property that the Euclidean distance between two color values gives a measure of the human perceived "closeness" of the two colors. This closeness is generally referred to as "$\Delta E$". Because of the failure of CIELUV space or CIELAB space to be truly perceptually uniform, other color difference equations have been devised to provide better measure of $\Delta E$. CIE originally recommended the "1976 formulae," one for the CIELUV space and one for the CIELAB space, which are simply the Euclidean distances of the spaces. As noted above, they were not satisfactory measure of the human perceived closeness. In 1994, CIE introduced the CIE94 equations, and more recently in 2000, the CIEDE2000 equations. These equations are considerably more complex than the 1976 equations, but they provide better measures of $\Delta E$.

The transformation used to transform a color device's color values into a device independent color space are ordinarily determined for each color device. The process of determining the transformation is termed "calorimetric characterization" or simply "color characterization." One approach to color characterization of color input devices such as scanners and digital cameras is to capture a color target having color patches representing a set of reference colors. The set of reference colors have known color values in a device independent color space such as CIEXYZ, CIELAB or CIELUV. The result of the capture is a bitmap image of the color patches, each of which is associated with an RGB value that is an average of RGB values for all captured pixels belonging to the color patch.

Once the set of RGB values are collected, color characterization is used to establish an empirical relationship between the device dependent RGB values and the known color values of each color patch in the device independent color space. More specifically, if the device dependent color space is denoted as RGB and the device independent color space is denoted as LMN, where LMN could be any of the device independent color spaces such as CIEXYZ, CIELAB, or CIELUV, then color characterization is a process of seeking a mathematical transformation from RGB to LMN that models as accurately as possible the behavior of the input device. Such a transformation is commonly termed a "forward model."

Particularly in the case of color input devices, it is well known that a forward model with good accuracy may be created using low degree polynomials. For example, a set of three cubic polynomials with 20 terms each in the R, G, and B variables may be used to calculate the L, M, N components of the chosen device independent color space LMN. For example, the form of the 20-term polynomial for L is:

$$L = a_1 + a_2 R + a_3 G + a_4 B + a_5 R^2 + a_6 RG + a_7 RB + a_8 G^2 + \\ a_9 GB + a_{10} B^2 + a_{11} R^3 + a_{12} R^2 G + a_{13} R^2 B + a_{14} RG^2 + \\ a_{15} RGB + a_{16} RB^2 + a_{17} G^3 + a_{18} G^2 B + a_{19} GB^2 + a_{20} B^3$$

Similar polynomials may be used to calculate the M and N components of the LMN color space using an input device's RGB values.

Since there are more measurements than coefficients, linear regression techniques may be used to determine the coefficients of the polynomials used in the forward model. Linear regression techniques find the coefficients of the polynomials that minimize a difference metric that measures errors between a reference color patch's known color value in the device independent color space and a color value calculated using the polynomials for the color patch from the RGB values of the color input patch. During the linear regression process, the coefficients of the polynomials are determined such that the sum of the color differences for all of the color patch reference color values and corresponding calculated color values is minimized. The resulting polynomials are then used as the forward model for transforming device dependent color values generated by the color input device into color values in the device independent color space.

A known problem with linear regression techniques is that linear regression implicitly assumes that the difference metric minimized during the linear regression process is the Euclidean distance between two color values in the color space LMN. However, it is questionable whether the Euclidean distance in the underlying color space is the correct measurement of color differences for the calculated color values. For instance, the Euclidean distance in the CIELUV color space generally gives an idea of how close two colors are, but there are better color difference equations to calculate $\Delta E$. When two colors are close, the Euclidean distance measurement and $\Delta E$ may actually change in opposite directions, that is, if the two colors are perturbed slightly, they may move closer according to one measurement, and further apart in the other. As such, linear regression processes may not generate polynomials with optimally minimized $\Delta E$ values even though the Euclidean distances may be optimally minimal.

As described above, some color difference equations give better measures of human perceived differences between color values within a color space. Therefore, a forward model determined using this class of color difference equations, rather than a Euclidean distance measurement, would yield more accurate device dependent color value to device independent color value transformations as perceived by a human. However, most color difference equations used to measure human perceived color differences are non-Euclidean distances of the underlying color space. This means that linear regression techniques may not be used to determine a transformation equation using a difference metric based on human perceived color differences.

Therefore, a need exists for a color characterization process that uses a difference metric based on human perceived color differences to determine a forward model for a color input device's color values. Various aspects of the present invention meet such a need.

SUMMARY OF THE INVENTION

A color characterization process utilizing nonlinear regression analysis to characterize a color input device is provided. The color input device is used to generate device dependent values from reference color values such as those on a color target. The bitmap of device dependent color values is used to generate a forward model that maps device dependent color values to color values in a device independent color space using a regression analysis that minimizes a color difference metric between the reference color values and the device dependent color values mapped through the forward model. The color difference metric is chosen to represent human perceived color differences in the device independent color space, and defines a nonlinear regression analysis. Thus, improved forward models may be generated because the process is not limited to difference metrics that define a strictly linear regression analysis.

In an aspect of the invention, a color characterization process for generating a color input device's forward model includes receiving a set of device dependent color values generated by the color input device in response to a standardized color target. The color target has color patches corresponding to a set of reference color values in a device independent color space. Regression analysis is used by the process to generate a forward model that maps device dependent color values to color values in the device independent color space. During the regression analysis, the process minimizes a color difference metric between the reference color values and the set of device dependent color values as mapped through the forward model. The choice of the color difference metric defines the regression analysis to be a nonlinear regression analysis.

In another aspect of the invention, the difference metric used is a measure of human perceived color differences within the device independent color space. The device independent color space may be a standardized color space such as CIELUV or CIELAB. If so, the color difference metric may be based on a color difference standard such as CIE94 or CIEDE2000, both of which define a nonlinear regression.

In another aspect of the invention, the nonlinear regression analysis includes an iterative process. The iterative process generates a trial forward model. The trial forward model, the set of device dependent color values, the color difference metric, and the set of reference color values in the device independent color space are used to generate a color difference measurement. Termination of the iterative process occurs when the color difference measurement is less than a color difference error threshold.

In another aspect of the invention, the initial trial forward model is generated using a linear regression analysis. The nonlinear regression analysis is initialized using the initial forward model.

In another aspect of the invention, the device independent color space is CIELUV, and the color difference error threshold is one.

In another aspect of the invention, the non-linear regression analysis includes an iterative process that terminates after a specified number of iterations.

This brief summary has been provided so that the nature of the invention may be quickly understood. A more complete understanding of the invention may be obtained by reference to the following detailed description in connection with the attached drawings.

DETAILED DESCRIPTION

Figure 1:
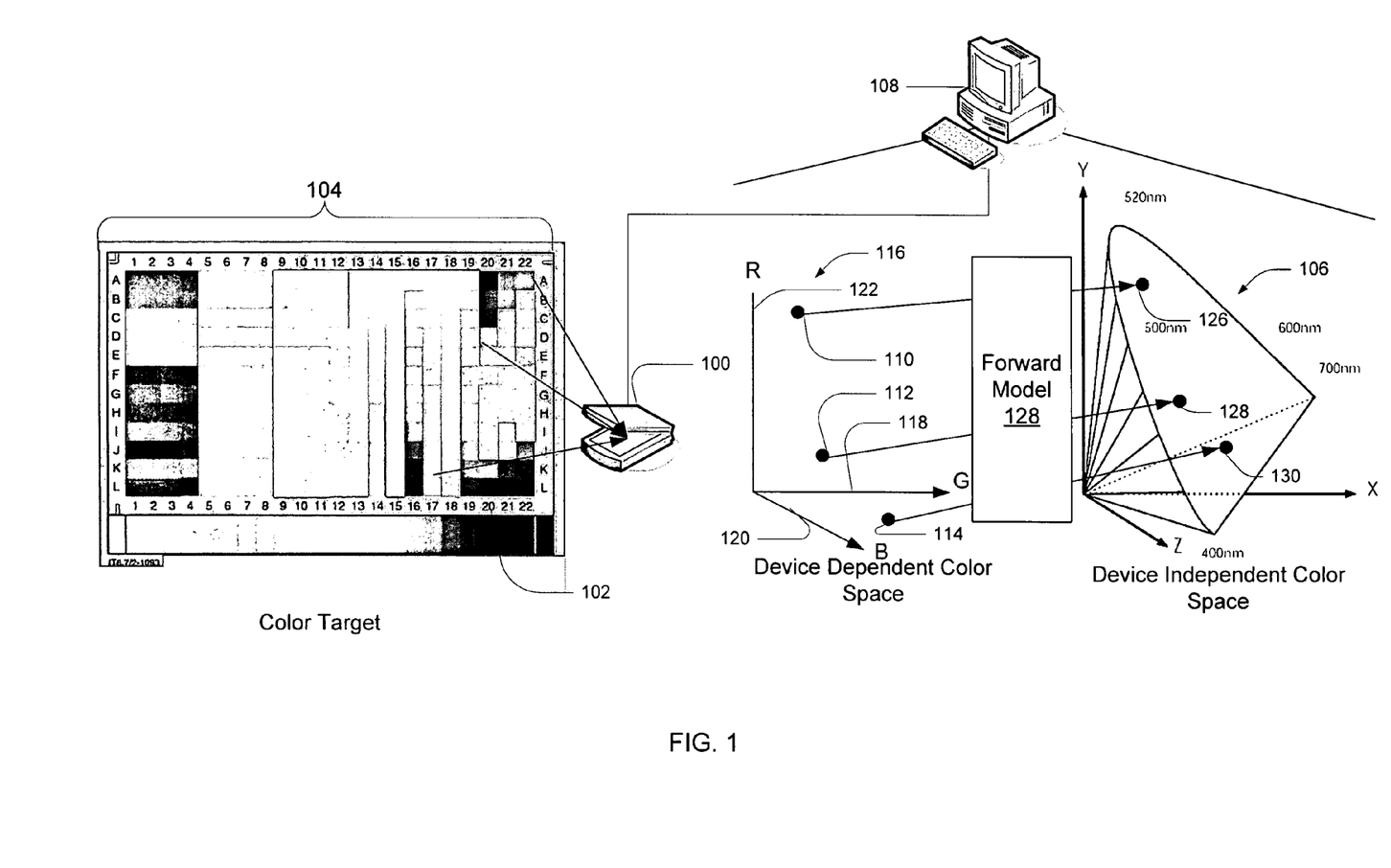
FIG. 1 is a block diagram depicting generating a set of device dependent color values in response to a color target by a color input device and mapping the device dependent color values into a device independent color space using a forward model.

FIG. 1 is a block diagram depicting generating a set of device dependent color values in response to a color target by a color input device and mapping the device dependent color values into a device independent color space using a forward model. A color input device 100, such as a scanner, captures a color target 102 to generate color values in a device dependent color space that may be unique to the color input device. The color target includes a plurality of color patches 104 each having a known reference color value in a device independent color space 106.

During a color characterization process, the color input device may be coupled to a data processing system 108, such as a personal computer. The color input device captures the color target and generates a plurality of device dependent color values, such as color values 110, 112, and 114, in response to the color target. For a typical color scanning device, the color values may be considered as points in a device dependent three-dimensional color space 116 having red 122, green 118, and blue 120 dimensions. As the three dimensions correspond to RGB values, the device dependent color space is herein termed RGB. In the case where the color input device is a digital device, the plurality of device dependent color values may be considered a color bitmap corresponding to the color target.

The data processing system uses the color bitmap having the device dependent color values and corresponding reference color values to generate a forward model 124 for the color input device. The forward model maps the set of device dependent color values into the device independent color space as mapped color values 126, 128, and 130. At the end of the color characterization process, the forward model may be used in any suitable manner to develop the color input device's device profiles used in a CMS, such as by generation of lookup tables. In addition, the forward model may also be used directly as part of the color input device's device profile.

As depicted above, the color input device is a color scanner. However, any color input device, such as film and reflective color scanners, digital still cameras, digital video cameras, etc., may be characterized using the present invention. In addition, the present invention has been described with respect to the color characterization of color input devices wherein the forward model is used either directly or indirectly in a CMS. However, the present invention may also be applied whenever a color input device is modeled. Such scenarios include, but are not limited to, creating color profiling software that supports scanners and digital cameras.

In the color characterization process, the choice of a device independent color space is arbitrary. Any standardized color space may be used. For example, the device independent color space may be CIEXYZ, CIELAB, or CIELUV. The choice of color target is arbitrary as well. An example color target is the IT8.7 color target defined by ANSI or a color target known under the trade name ColorChecker®.

Figure 2:
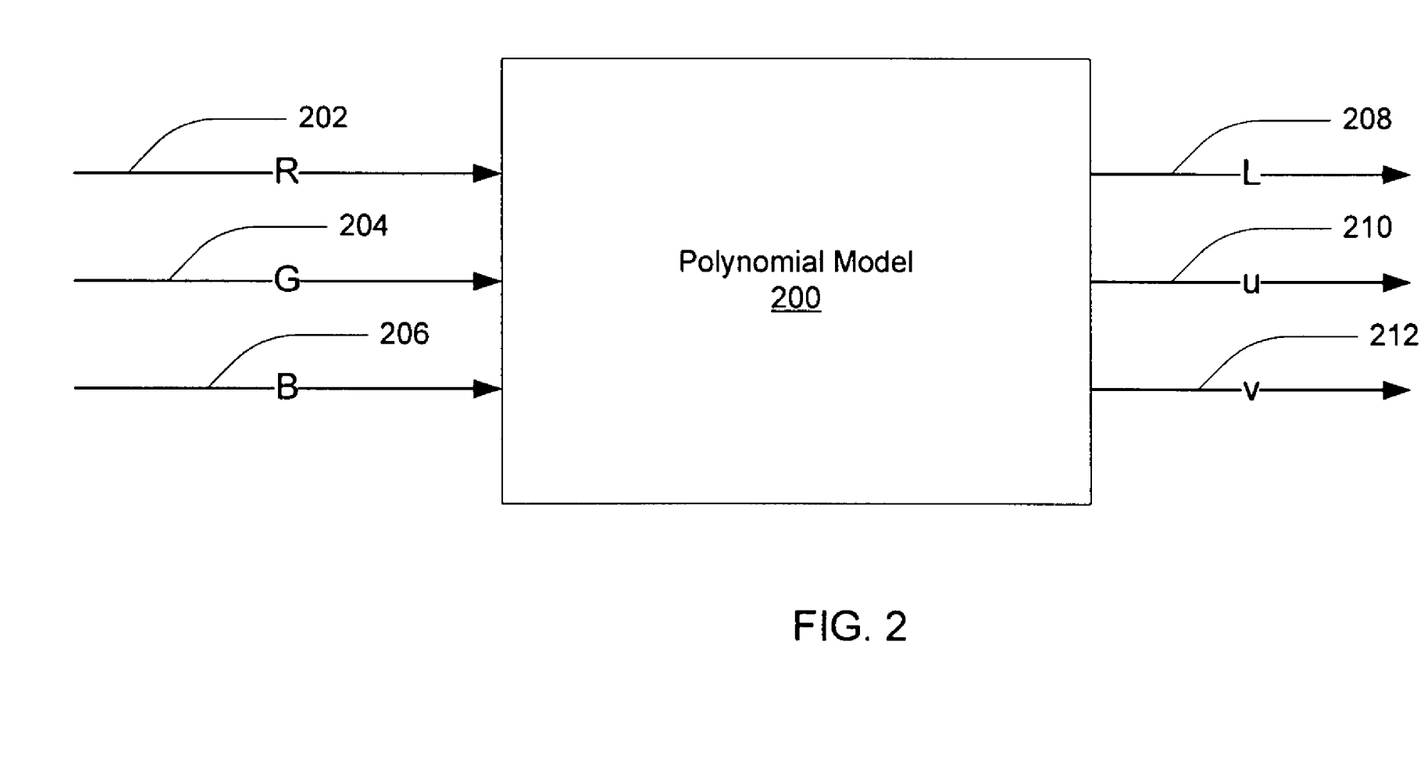
FIG. 2 is a block diagram depicting a polynomial-based forward model.

FIG. 2 is a block diagram depicting a polynomial-based forward model. If the device independent color space is denoted LMN (where LMN could be any of the device independent color spaces such as CIEXYZ, CIELAB, or CIELUV), then a forward model 200 for the color input device is a mathematical transformation from RGB to LMN that models as accurately as possible the behavior of the color input device. Such a transformation can be modeled reasonably well by polynomials of low degree. For example, three polynomials with three, six, eight, nine, 11, 14 or 20 terms in R 202, G 204, and B 206 variables, respectively define L 208, M 210, and N 212 components of the chosen device independent color space LMN. In preferred embodiments of the present invention, the forward model is composed of these cubic 20-term polynomials used to transform RGB color values into CIELUV color values. The polynomials are given by:

$$\hat{L}(R, G, B) = \lambda_1 + \lambda_2 R + \lambda_3 G + \lambda_4 B + \lambda_5 R^2 + \lambda_6 RG + \lambda_7 RB +$$
$$\lambda_8 G^2 + \lambda_9 GB + \lambda_{10} B^2 + \lambda_{11} R^3 + \lambda_{12} R^2 G + \lambda_{13} R^2 B + \lambda_{14} RG^2 +$$
$$\lambda_{15} RGB + \lambda_{16} RB^2 + \lambda_{17} G^3 + \lambda_{18} G^2 B + \lambda_{19} GB^2 + \lambda_{20} B^3$$

$$\hat{u}(R, G, B) = \alpha_1 + \alpha_2 R + \alpha_3 G + \alpha_4 B + \alpha_5 R^2 + \alpha_6 RG + \alpha_7 RB +$$
$$\alpha_8 G^2 + \alpha_9 GB + \alpha_{10} B^2 + \alpha_{11} R^3 + \alpha_{12} R^2 G + \alpha_{13} R^2 B + \alpha_{14} RG^2 +$$
$$\alpha_{15} RGB + \alpha_{16} RB^2 + \alpha_{17} G^3 + \alpha_{18} G^2 B + \alpha_{19} GB^2 + \alpha_{20} B^3$$

$$\hat{v}(R, G, B) = \beta_1 + \beta_2 R + \beta_3 G + \beta_4 B + \beta_5 R^2 + \beta_6 RG + \beta_7 RB +$$
$$\beta_8 G^2 + \beta_9 GB + \beta_{10} B^2 + \beta_{11} R^3 + \beta_{12} R^2 G + \beta_{13} R^2 B + \beta_{14} RG^2 +$$
$$\beta_{15} RGB + \beta_{16} RB^2 + \beta_{17} G^3 + \beta_{18} G^2 B + \beta_{19} GB^2 + \beta_{20} B^3$$

Where:
  $\hat{L}(R, G, B)$ is the L component of a color value in CIELUV corresponding to a color value having components R, G, and B in the device dependent color space;
  $\hat{u}(R, G, B)$ is the u component of a color value in CIELUV corresponding to a color value having components R, G, and B in the device dependent color space; and
  $\hat{v}(R, G, B)$ is the v component of a color value in CIELUV corresponding to a color value having components R, G, and B in the device dependent color space.

The generation of a forward model composed of polynomials is a process of seeking polynomial coefficients such that the polynomials provide the "best-fit" model that minimizes a measure of total error between a set of sampled color values mapped from the device dependent color space into the device independent color space and the corresponding reference color values.

In the present invention, the error is measured by a difference metric that defines a nonlinear regression analysis. Some difference metrics that are used by various embodiments of the invention are CIE94 and CIEDE2000.

Figure 3:
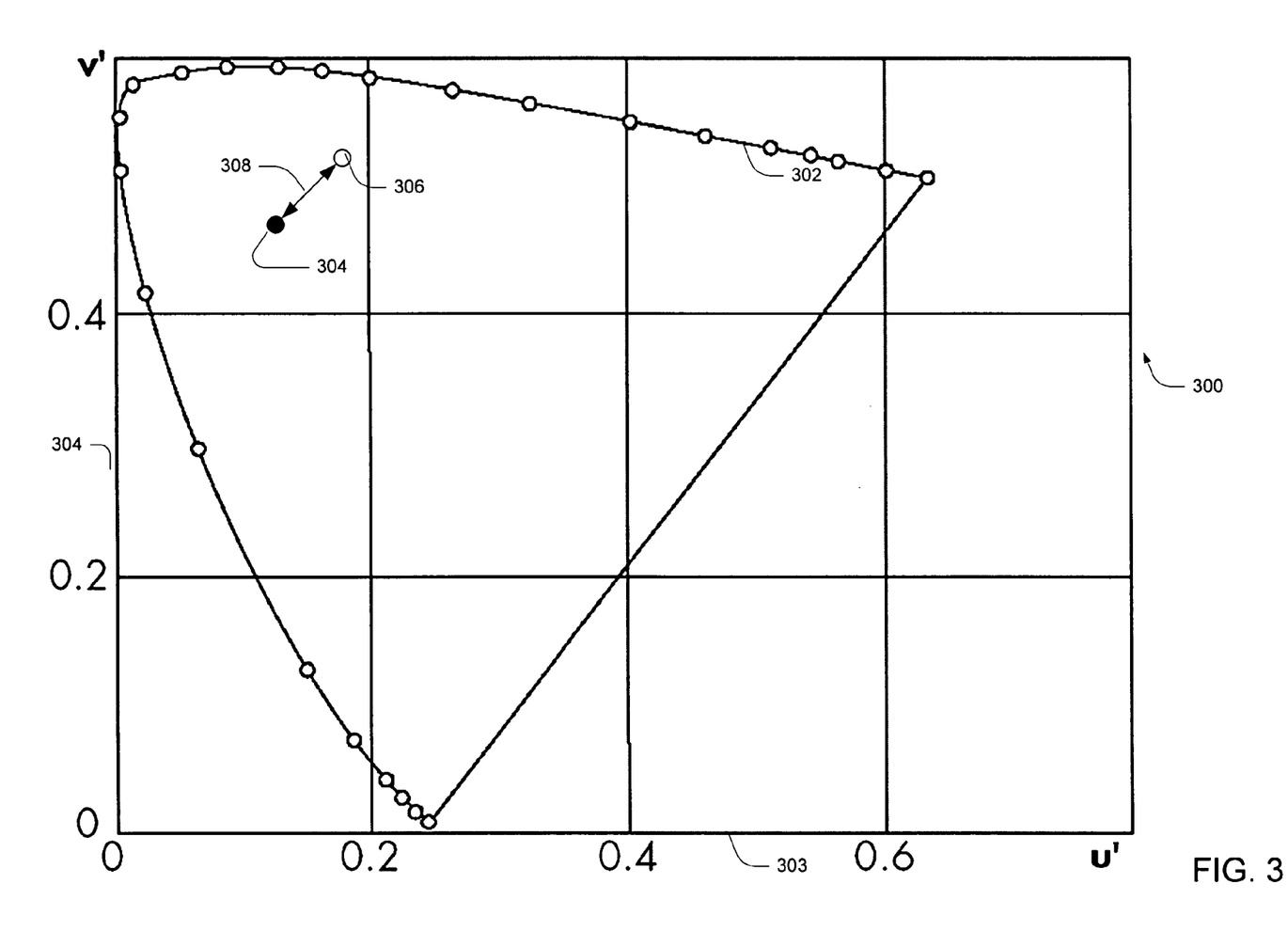
FIG. 3 is a chromaticity diagram depicting color differences between reference color values and mapped color values within a device independent color space.

FIG. 3 is a chromaticity diagram depicting color differences between reference color values and mapped color values within a device independent color space. The chromaticity diagram 300 depicts a spectral locus 302 defining a boundary of a visible color gamut in terms of u' 303 and v' 304 at a specific L value in CIELUV coordinates. The visible color gamut encloses a set of color values in the device independent color space corresponding to human perceived colors. For a color input device, a forward model maps a color value in the color input device's color space to a color value, such as mapped color value 305, in the device independent color space. During the color characterization process, the mapped color value corresponds to a reference color value, such as reference color value 306, for a color patch in a color target.

Within the device independent color space, a color difference 308 between the mapped color value and its corresponding reference value may be evaluated in a variety of ways. To determine how well a forward model maps device dependent color values into the device independent color space, a process may sum a plurality of evaluated color differences for a plurality of mapped color values and corresponding reference color values. The resulting summation may be used as a difference metric to determine how well the forward model performs.

One way to evaluate a color difference is to use the Euclidean distance between two points in the color space. In the case where CIELUV is the device independent color space, an evaluation of the total error for forward model is given by:

$$\Theta(\lambda_i, \alpha_i \beta_i) = \sum_i dist^2_{CIELUV}(\hat{L}(R_i, G_i, B_i), \hat{u}(R_i, G_i, B_i), \hat{v}(R_i, G_i, B_i); L_i, u_i, v_i)$$

where $dist_{CIELUV}(\hat{L}(R_i,G_i,B_i), \hat{u}(R_i,G_i,B_i), \hat{v}(R_i,G_i,B_i); L_i, u_i, v_i)$ is the Euclidean distance between a mapped color value mapped from color value $R_i G_i B_i$ and the mapped color value's corresponding reference color value $L_i, u_i, v_i$. Thus, the objective function $\Theta(\lambda_i, \alpha_i, \beta_i)$ is the sum of squares of Euclidean distances in the CIELUV color space and is quadratic in the parameters $\lambda_i, \alpha_i, \beta_i$.

For a color value in CIELUV, $dist^2_{CIELUV}$ is given by:

$$dist^2_{CIELUV}(L,u,v,L_0,u_0,v_0) = (L-L_0)^2 + (u-u_0)^2 + (v-v_0)^2$$

Where:
L is the L value of the mapped color value;
$L_0$ is the L value of the corresponding reference color value;
u is the u value of the mapped color value;
$u_0$ is the u value of the corresponding reference color value;
v is the v value of the mapped color value; and
$v_0$ is the v value of the corresponding reference color value.

However, as noted above, although the Euclidean definition of difference metric is easy to solve since the Euclidean definition of difference defines a linear regression problem, there are other more desirable difference metrics. Other color difference equations have been developed that are based on human perceptions of color differences. For example, a color difference based on a measure of human perceived color differences is the color difference equation CIE94. CIE94 was introduced by the Commission Internationale de l'Éclairage (CIE) in 1995 to provide a standardized color difference formula for industrial use. CIE94 is defined in terms of the coordinate in the CIELAB color space.

In order to use CIE94 for two color values in the CIELUV color space, the two color values are first converted into CIELAB coordinates. For a CIELUV color value having CIELUV coordinates $(L_i, u_i, v_i)$ with a reference white point $(X_n, Y_n, Z_n)$ in the CIEXYZ color space, the color value is converted to CIELAB and LCH color values as follows:

$$L_i = L_i$$

$$a_i = A(L_i, u_i, v_i; X_n, Y_n, Z_n)$$

$$C_i = \sqrt{a_i^2 + b_i^2}$$

$$b_i = B(L_i, u_i, v_i; X_n, Y_n, Z_n)$$

$$H_i = \tan^{-1}(b_i/a_i)$$

Where:
$L_i$ is the lightness value;
$a_i$ is the a* value;
$b_i$ is the b* value;

C is the chroma value; and
H is the hue angle.

The A and B functions are the end results of nonlinear transformations that start from the CIELUV color space to the CIELAB color space via the CIEXYZ space. Each step is defined by CIE.

For two color values in CIELUV having CIELUV coordinates $(L_0, u_0, v_0)$ and $(L_i, u_i, v_i)$, CIE94 is defined as:

$$\Delta E^2_{CIE94}(L_1, u_1, v_1; L_0, u_0, v_0) = \delta_1^2(L_1, u_1, v_1; L_0, u_0, v_0) + \delta_2^2(L_1, u_1, v_1; L_0, u_0, v_0) + \delta_3^2(L_1, u_1, v_1; L_0, u_0, v_0)$$

with:

$$\delta_1(L_1, u_1, v_1; L_0, u_0, v_0) = (L_1 - L_0)/k_L S_L$$
$$\delta_2(L_1, u_1, v_1; L_0, u_0, v_0) = (C_1 - C_0)/k_C S_C$$
$$\delta_3(L_1, u_1, v_1; L_0, u_0, v_0) = \Delta H(L_1, u_1, v_1; L_0, u_0, v_0)/k_H S_H$$

and:

$$\Delta H(L_1, u_1, v_1; L_0, u_0, v_0) = \sqrt{(a_1 - a_0)^2 + (b_1 - b_0)^2 - (C_1 - C_0)^2}$$

$$k_L = k_C = k_H = 1$$
$$S_L = 1$$
$$S_C = 1 + 0.045\sqrt{C_0 C_1}$$
$$S_H = 1 + 0.015\sqrt{C_0 C_1}$$

For a plurality of mapped color values and their corresponding reference color values, a total error function may be defined as:

$$\Psi(\lambda_i, \alpha_i \beta_i) = \sum_i \Delta E^2_{CIE94}(\hat{L}(R_i, G_i, B_i), \hat{u}(R_i, G_i, B_i), \hat{v}(R_i, G_i, B_i); L_i, u_i, v_i)$$

where the summation is through all the data point pairs $(R_i, G_i, B_i; L_i, u_i, v_i)$ in the training data set.

In one embodiment of the present invention, CIEDE2000 is used as a color difference metric. CIEDE2000 is a modification of CIE94 and is given by:

$$\Delta E_{DO} = \left[\left(\frac{\Delta L'}{k_L S_L}\right)^2 + \left(\frac{\Delta C'}{k_C S_C}\right)^2 + \left(\frac{\Delta H'}{k_H S_H}\right)^2 + R_T \left(\frac{\Delta C'}{k_C S_C}\right)\left(\frac{\Delta H'}{k_H S_H}\right)\right]^{1/2}$$

with:

$$S_L = 1 + \frac{0.015(\overline{L}' - 50)^2}{\sqrt{20 + (\overline{L}' - 50)^2}}$$

$$S_C = 1 + 0.045\overline{C}'$$

$$S_H = 1 + 0.015\overline{C}' T$$

$$G = 0.5\left(1 - \sqrt{\frac{\overline{C}_{ab}^{*7}}{\overline{C}_{ab}^{*7} + 25^7}}\right)$$

$$T = 1 - 0.17 \cos(\overline{h}' - 30) + 0.24 \cos(2\overline{h}') + 0.32 \cos(3\overline{h}' + 6) - 0.20 \cos(4\overline{h}' - 63)$$

$$R_{T'} = -\sin(2\Delta\Theta)R_C$$

-continued $$\Delta\Theta = 30 \exp\left\{-\left[(\overline{h'} - 275)/25\right]^2\right\}$$

$$R_C = 2\sqrt{\frac{\overline{C'}^7}{\overline{C'}^7 + 25^7}}$$

Generation of a forward model is a process of seeking coefficients for the forward model that minimizes a measure of total error between a set of mapped color values and the corresponding reference color values in the device independent color space. For a forward model composed of three polynomials, the polynomial coefficients $\lambda_i$, $\alpha_i$, and $\beta_i$ are sought such that the polynomials provide the "best-fit" forward model that minimizes the total error.

A best-fit may be determined by minimizing the objective function Ψ from above. However, because the objective function Ψ for CIE94 is a nonlinear function of the polynomial parameters $\lambda_i$, $\alpha_i$, and $\beta_i$, a nonlinear optimization technique is used to solve the optimization problem. In one embodiment of the present invention, the nonlinear optimization technique used is the iterative Levenberg-Marquardt procedure.

Iterative procedures such as Levenberg-Marquardt begin with an initial guess at a solution. A good initial guess improves the chances that a solution is found that corresponds to a correct minimum value of the objective function. In one embodiment of the present invention, an initial guess is a solution for $\lambda_i$, $\alpha_i$, and $\beta_i$ supplied by a linear optimization process. In a preferred embodiment of the present invention, the objective function Θ from above is used for the linear optimization process.

Figure 4:
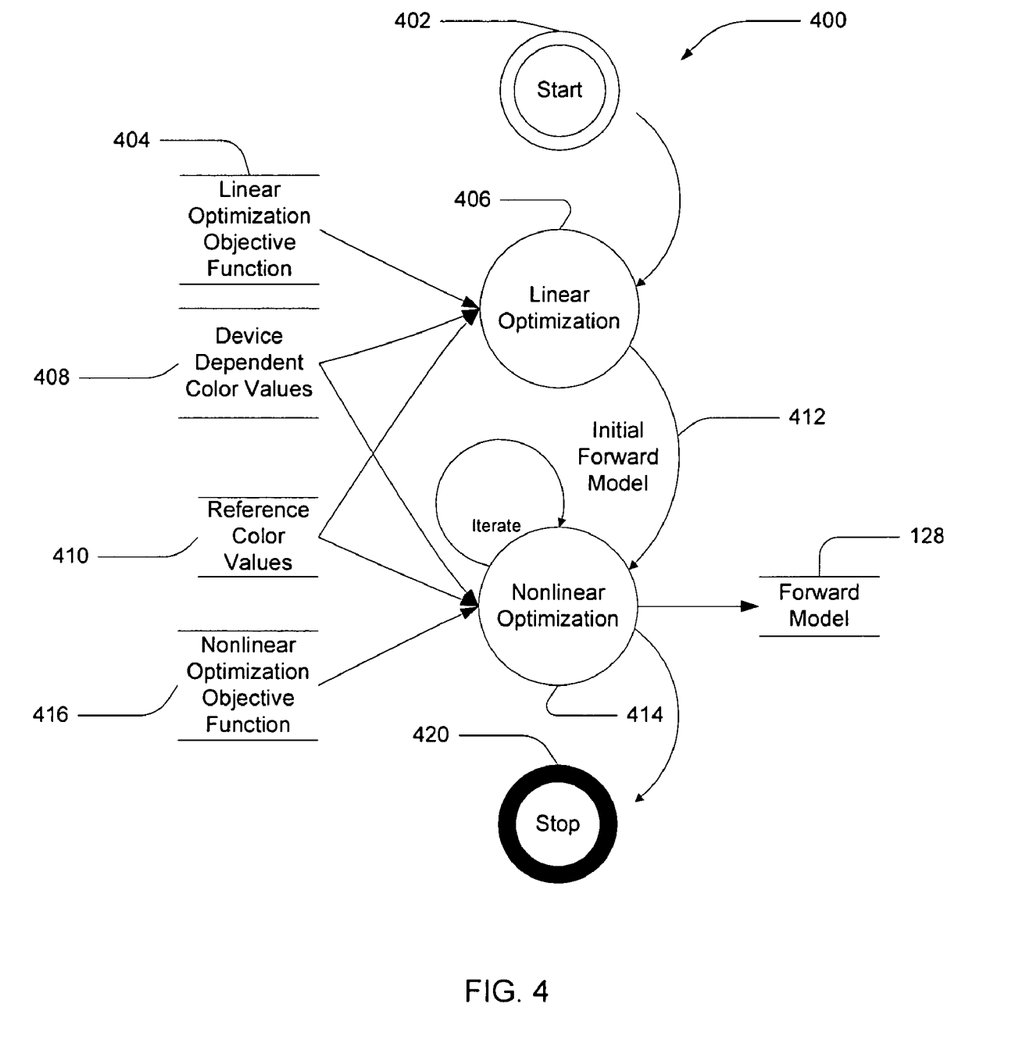
FIG. 4 is a data flow diagram depicting generation of a forward model using a nonlinear regression analysis.

FIG. 4 is a data flow diagram depicting generation of a forward model using a nonlinear regression analysis in accordance with an embodiment of the present invention. A forward model determination process 400 starts 402 by receiving a linear optimization objective function 404 that is used in a linear optimization process 406. The linear optimization process uses the linear optimization objective function along with a set of device dependent color values 408 and their corresponding reference color values 410 to generate an initial forward model 412. The initial forward model includes a trial solution for the polynomial parameters $\lambda_i$, $\alpha_i$, and $\beta_i$ denoted $\lambda_i$, $\alpha_i$, $\beta_i$.

The initial model is used to initialize a nonlinear optimization process 414. The nonlinear optimization process uses a nonlinear optimization objective function 416 along with the device dependent color values and corresponding reference color values to generate a final forward model 128. The process then terminates.

In one embodiment of the invention, generation of $\lambda_i$, $\alpha_i$, $\beta_i$ is accomplished through the use of a linear regression analysis. The objective function used during the linear regression analysis is the sum of squares of distances in CIELUV space between the captured and mapped color values and the reference color values.

The mathematical solution to such a "linear least squares" problem is well defined. Because $\lambda_i$, only appears in the L modeling, $\alpha_i$ only in the u modeling, and $\beta_i$ only in the v modeling, it is possible to decompose the optimization problem into three sub-problems, one for L, one for u, and one for v. Considering the L equations for now, (the u equations and the v equations follow exactly the same form) then the problem of minimizing the sum of squares of errors in L can be stated as solving the following matrix equation in the least squares sense:

$$\begin{pmatrix} 1 & R_1 & G_1 & B_1 & \cdots & G_1 B_1^2 & B_1^3 \\ 1 & R_2 & G_2 & B_2 & \cdots & G_2 B_2^2 & B_2^3 \\ \vdots & \vdots & \vdots & \vdots & \ddots & \vdots & \vdots \\ 1 & R_N & G_N & B_N & \cdots & G_N B_N^2 & B_N^3 \end{pmatrix} \begin{pmatrix} \lambda_1 \\ \lambda_2 \\ \vdots \\ \lambda_{20} \end{pmatrix} = \begin{pmatrix} L_1 \\ L_2 \\ \vdots \\ L_N \end{pmatrix} \text{ or } R\Lambda = L$$

where N is the total number of data points in the training set, and is usually the same as the number of color patches in the characterization color target. As N is much larger than the degree of the polynomials used to described the forward model, the above equation is over-determined, thereby suggesting a least squares solution.

A closed form solution for Λ is available, namely:

$$\Lambda = (R^T R)^{-1} (R^T L)$$

Direct evaluation using the closed form solution might have poor numerical properties. In certain embodiments of the present invention, a matrix factorization algorithm is applied to the coefficient matrix. This step reduces the system of equations to a canonical form. In preferred embodiments of the invention, Singular Value Decomposition (SVD) is applied to the matrix R and the resulting decomposed system is solved.

Figure 5:
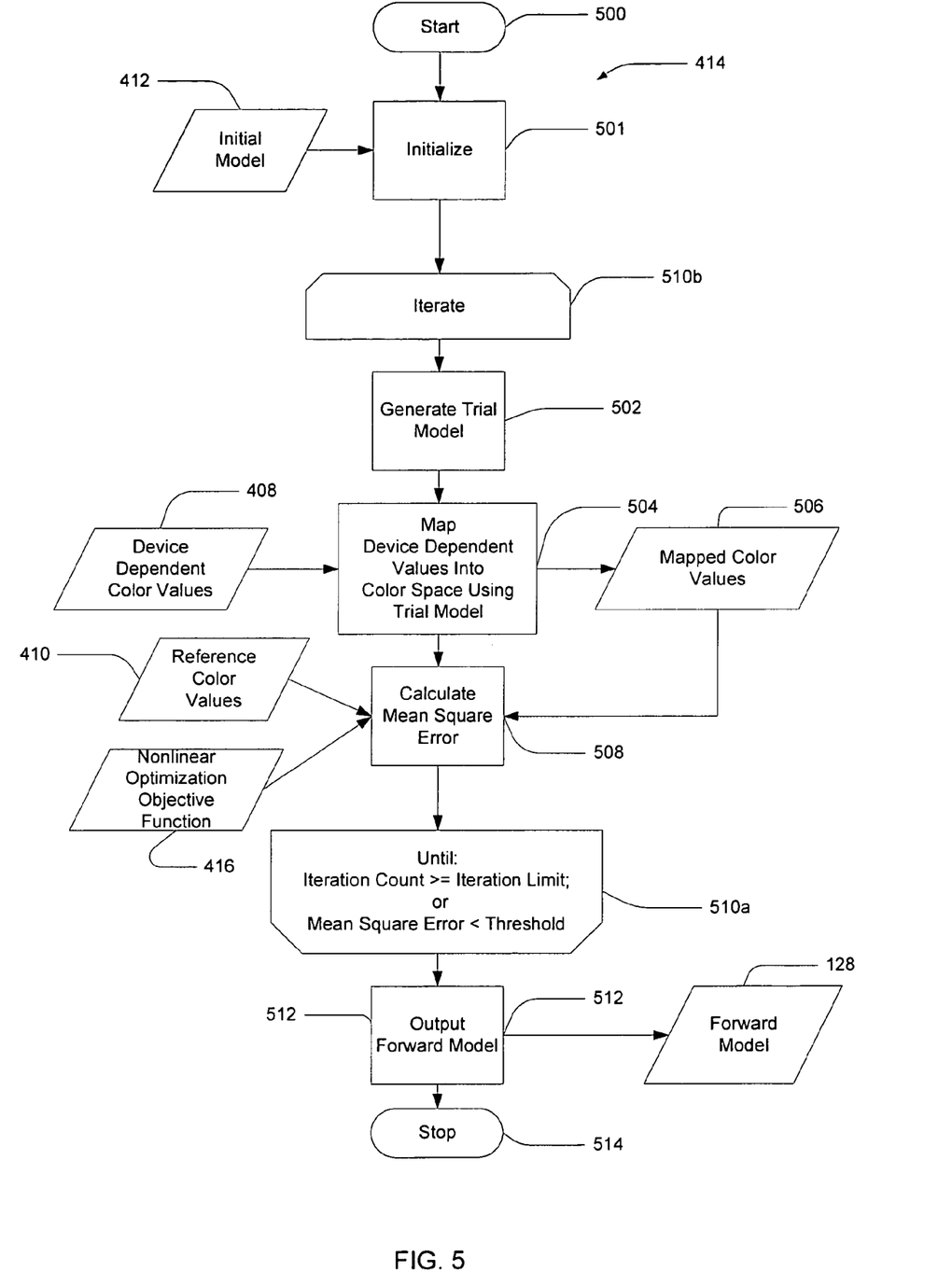
FIG. 5 is a process flow diagram of a nonlinear optimization process.

FIG. 5 is a process flow diagram of a nonlinear optimization process used to generate a final forward model. The nonlinear optimization process 414 starts 500 by receiving an initial forward model 412. The coefficients of the initial forward model are used to initialize 501 the nonlinear optimization process. In the case where the forward model is based on three polynomials, the coefficients $\lambda_i$, $\alpha_i$, $\beta_i$ of the polynomials in the initial forward model are used.

In the nonlinear optimization process, a trial forward model 502 is computed that might generate a lower error value when comparing the mapped color values and the reference color values than a previous trial forward model. The trial forward model is used to map 504 the device dependent color values 408 into the device independent color space thus generating mapped color values 506. The mapped color values are used along with corresponding reference color values 410 to calculate 508 a total error according to the nonlinear optimization objective function 416.

The nonlinear optimization iterates, 510a and 510b, generating trial forward models and calculated total error for the trial forward models until a termination criterion is reached. The termination criterion is ordinarily satisfied when the total error falls below an error threshold or the number of iterations exceeds a certain threshold. In preferred embodiments of the present invention, the nonlinear optimization process terminates if the objective function, Ψ divided by N, the number of data points in the training set, is less than one, or the number of iterations performed has exceeded ten.

The threshold value for the mean square total error comes from the use of color difference equation CIE94. In accordance with the use of this color difference equation, color values having a difference of less than or equal to one are thought to be perceived by humans as being the same color. The iteration limit of ten arises from practical experience with the procedure. If the first few iterations do not reduce the error significantly, further iterations might not help much. Instead the total error value oscillates without converging. In the case where the nonlinear optimization process diverges, the best trial forward model obtained during the iterations is adopted. Once the nonlinear optimization process has reached the termination criterion, the nonlinear optimization process outputs 512 a final forward model 128 and terminates 514.

In preferred embodiments of the present invention, the Levenberg-Marquardt procedure is used as the nonlinear optimization procedure. In the Levenberg-Marquardt procedure, a trial solution is computed that might be closer to an optimal solution than the previous trial solution. The trial solution satisfies a set of linear equations dependent on the value of the objective function and the values of the derivatives of the objective function at the state of the procedure. For this reason, the derivatives of the objective function $\Psi$ with respect to the parameters $\lambda_i$, $\alpha_i$, and $\beta_i$ are inputs to the Levenberg-Marquardt procedure. Although there may be a large number of parameters, there is a shortcut that reduces the computational load of the procedure. By the Chain Rule of Calculus, $$\frac{\partial \psi}{\partial \lambda_j} = \sum_{i=1}^{N} \frac{\partial \Delta E^2_{CIE94}(L, u, v, L_i, u_i, v_i)}{\partial L}\bigg|_{\hat{L},\hat{u},\hat{v}} R_{ij}$$

$$\frac{\partial \psi}{\partial \alpha_j} = \sum_{i=1}^{N} \frac{\partial \Delta E^2_{CIE94}(L, u, v, L_i, u_i, v_i)}{\partial u}\bigg|_{\hat{L},\hat{u},\hat{v}} R_{ij}$$

$$\frac{\partial \psi}{\partial \beta_j} = \sum_{i=1}^{N} \frac{\partial \Delta E^2_{CIE94}(L, u, v, L_i, u_i, v_i)}{\partial v}\bigg|_{\hat{L},\hat{u},\hat{v}} R_{ij}$$

Where:
j=1 to the number of terms of each polynomial used in the forward model;
$L_i$, $u_i$, and $v_i$ are the CIELUV color values of the ith mapped color value; and
$R_{ij}$ is the (i, j)th entry of the matrix R defined above.

Instead of computing derivatives with respect to the a large number of parameters, derivatives with respect to L, u and v are computed. In preferred embodiments of the present invention, the derivatives are computed using numerical forward differencing.

Figure 6:
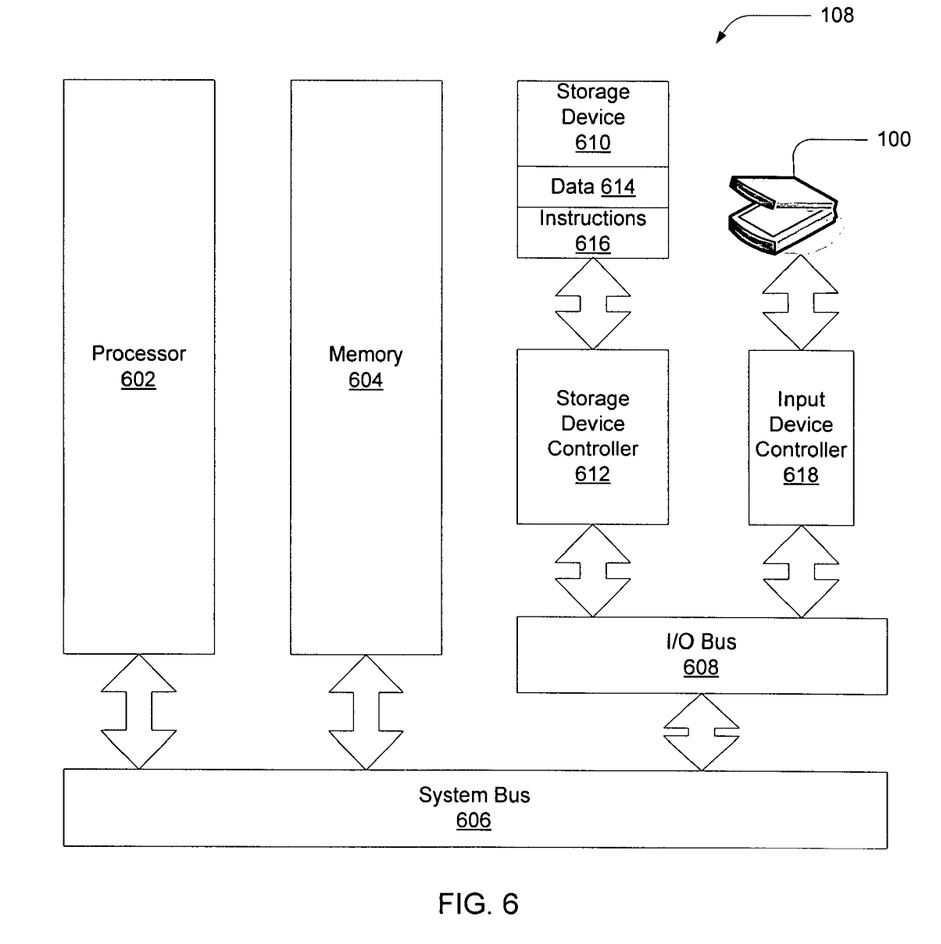
FIG. 6 is a block diagram of a data processing apparatus that may be used to generate a forward model in accordance with the present invention.

FIG. 6 is a block diagram of a data processing system that may be used to generate a forward model. The data processing system 108 includes a processor 602 coupled to a memory 604 via system bus 606. The processor is also coupled to external Input/Output (I/O) devices via the system bus and an I/O bus 608. A storage device having computer system readable media 610 is coupled to the processor via a storage device controller 612 and the I/O bus and the system bus. The storage device is used by the processor to store and read data 614 and program instructions 616 used to implement the forward model generation methods described above. The processor may be further coupled to an input device, such as a color input device 100, via an input device controller 618 coupled to the I/O bus.

In operation, the processor loads the program instructions from the storage device into the memory. The processor executes the loaded program instructions to receive a set of device dependent color values from the color input device. The set of device dependent color values correspond to a set of reference color values as previously described. The processor then executes the program instructions to generate a forward model for the color input device as described above.

The present invention has been described above with respect to particular illustrative embodiments. It is understood that the present invention is not limited to the above-described embodiments and that various changes and modifications may be made by those skilled in the relevant art without departing from the spirit and scope of the invention.

What is claimed is:

1. A method of color characterization for a color input device, comprising:
receiving a set of device dependent color values corresponding to a set of reference color values in a device independent color space; and
generating a forward model that maps device dependent color values to color values in the device independent color space using a regression analysis that minimizes a color difference metric between the reference color values and the color values in the device independent color space, wherein the color values are mapped from the device dependent color values corresponding to the reference color values through the forward model, and wherein the color difference metric defines a non-linear regression analysis.

2. The method of claim 1, wherein the color difference metric is a measure of human perceived color differences.

3. The method of claim 2, wherein the measure of human perceived color differences is CIE94.

4. The method of claim 2, wherein the measure of human perceived color differences is CIEDE2000.

5. The method of claim 1, further comprising: generating an initial forward model using linear regression analysis; and
initializing the non-linear regression analysis using the initial forward model.

6. The method of claim 5, wherein the linear regression analysis uses a color distance metric.

7. The method of claim 6, wherein the device independent color space is CIELUV and the color distance metric is a Euclidean distance between color values.

8. The method of claim 1, wherein the non-linear regression analysis includes an iterative process, the iterative process comprising:
generating a trial forward model;
generating a color difference measurement using the trial forward model, the set of device dependent color values, and the set of reference color values in the device independent color space; and
terminating the iterative process when the color difference measurement is less than a color difference error threshold.

9. The method of claim 8, wherein:
the device independent color space is CIELUV; and
the color difference error threshold is one.

10. The method of claim 8, wherein the iterative process is terminated after a specified number of iterations.

11. A data processing system for characterizing a color input device, comprising:
a processor; a memory coupled to the processor, the memory having program instructions executable by the processor stored therein, the program instructions comprising:
instructions to receive a set of device dependent color values corresponding to a set of reference color values in a device independent color space; and
instructions to generate a forward model that maps device dependent color values to color values in the device independent color space using a regression analysis that minimizes a color difference metric between the reference color values and the color values in the device independent color space, wherein the color values are mapped from the device dependent color values corresponding to the reference color values through the forward model, and wherein the color difference metric defines a non-linear regression analysis.

12. The data processing system of claim 11, wherein the color difference metric is a measure of human perceived color differences.

13. The data processing system of claim 12, wherein the measure of human perceived color differences is CIE94.

14. The data processing system of claim 12, wherein the measure of human perceived color differences is CIEDE2000.

15. The data processing system of claim 11, the program instructions further comprising:
 instructions to generate an initial forward model using linear regression analysis; and
 instructions to initialize the non-linear regression analysis using the initial forward model.

16. The data processing system of claim 15, the program instructions further comprising using color distance metric as an objective function for the linear regression analysis.

17. The data processing system of claim 16, wherein the device independent color space is CIELUV, the program instructions further comprising instructions to generate the color distance metric by calculating a Euclidean distance between color values in CIELUV.

18. The data processing system of claim 11, wherein the non-linear regression analysis comprises an iterative process, the program instructions further comprising:
 instructions to generate a trial forward model;
 instructions to generate a color difference measurement using the trial forward model, the set of device dependent color values, and the set of reference color values in the device independent color space; and
 instructions to terminate the iterative process when the color difference measurement is less than a color difference error threshold.

19. The data processing system of claim 18, wherein:
 the device independent color space is CIELUV; and
 the color difference error threshold is one.

20. The data processing system of claim 11, wherein the non-linear regression analysis includes an iterative process, the program instructions further comprising instructions to terminate the iterative process after a specified number of iterations.

21. A data processing system readable media having program instructions stored thereon, the program instructions comprising:
 receiving a set of device dependent color values corresponding to a set of reference color values in a device independent color space; and
 generating a forward model that maps device dependent color values to color values in the device independent color space using a regression analysis that minimizes a color difference metric between the reference color values and the color values in the device independent color space, wherein the color values are mapped from the device dependent color values corresponding to the reference color values through the forward model, and wherein the color difference metric defines a non-linear regression analysis.

22. The data processing system readable media of claim 21, wherein the color difference metric is a measure of human perceived color differences.

23. The data processing system readable media of claim 22, wherein the measure of human perceived color differences is CIE94.

24. The data processing system readable media of claim 22, wherein the measure of human perceived color differences is CIEDE2000.

25. The data processing system readable media of claim 21, the program instructions further comprising:
 generating an initial forward model using linear regression analysis; and
 initializing the non-linear regression analysis using the initial forward model.

26. The data processing system readable media of claim 25, the program instructions further comprising using color distance metric as an objective function for the linear regression analysis.

27. The data processing system readable media of claim 26, wherein the device independent color space is CIELUV, the program instructions further comprising generating the color distance metric by calculating a Euclidean distance between color values in CIELUV.

28. The data processing system readable media of claim 21, wherein the non-linear regression analysis comprises an iterative process, the program instructions further comprising:
 generating a trial forward model;
 generating a color difference measurement using the trial forward model, the set of device dependent color values, and the set of reference color values in the device independent color space; and
 terminating the iterative process when the color difference measurement is less than a color difference error threshold.

29. The data processing system readable media of claim 28, wherein:
 the device independent color space is CIELUV; and
 the color difference error threshold is one.

30. The data processing system readable media of claim 21, wherein the non-linear regression analysis includes an iterative process, the program instructions further comprising terminating the iterative process after a specified number of iterations.

* * * * *

UNITED STATES PATENT AND TRADEMARK OFFICE
CERTIFICATE OF CORRECTION

PATENT NO. : 7,414,753 B2
APPLICATION NO. : 10/840539
DATED : August 19, 2008
INVENTOR(S) : Siu-Kei Tin It is certified that error appears in the above-identified patent and that said Letters Patent is hereby corrected as shown below:

TITLE PAGE:
 (56) "2005153289  A" should read -- 2005-153289  A --.

COLUMN 2:
 Line 27, ""calorimetric" should read -- "colorimetric --.

COLUMN 7:
 Line 12, "$\Theta(\lambda_1, \alpha_i \beta_i) =$" should read -- $\Theta(\lambda_i, \alpha_i, \beta_i) =$ --.

COLUMN 8:
 Line 12, "$\Psi(\lambda_1, \alpha_i \beta_i) =$" should read -- $\Psi(\lambda_i, \alpha_i, \beta_i) =$ --.

COLUMN 9:
 Line 45, " $\lambda_i, \alpha_i \beta_i$ " should read -- $\tilde{\lambda}_i, \tilde{\alpha}_i, \tilde{\beta}_i$ --; and
 Line 52, " $\lambda_i, \alpha_i \beta_i$ " should read -- $\tilde{\lambda}_i, \tilde{\alpha}_i, \tilde{\beta}_i$ --.

COLUMN 10:
 Line 7, "$\lambda_{20}$" should read -- $\lambda_N$ --;
 Line 13, "described" should read -- describe --; and Line 34, " $\lambda_i, \alpha_i \beta_i$ " should read -- $\tilde{\lambda}_i, \tilde{\alpha}_i, \tilde{\beta}_i$ --.

COLUMN 11:
 Line 37, "the" should be deleted.

UNITED STATES PATENT AND TRADEMARK OFFICE
CERTIFICATE OF CORRECTION

PATENT NO. : 7,414,753 B2
APPLICATION NO. : 10/840539
DATED : August 19, 2008
INVENTOR(S) : Siu-Kei Tin It is certified that error appears in the above-identified patent and that said Letters Patent is hereby corrected as shown below:

<u>COLUMN 12</u>:
      Line 26, "generating" should read -- ¶generating --; and
      Line 53, "processing;" should read -- processor;¶ --.

Signed and Sealed this

Twenty-seventh Day of January, 2009

JOHN DOLL
*Acting Director of the United States Patent and Trademark Office*